(12) United States Patent
Kurtz et al.

(10) Patent No.: US 7,669,479 B2
(45) Date of Patent: Mar. 2, 2010

(54) COMBINED TEMPERATURE AND PRESSURE TRANSDUCER INCORPORATING CONNECTOR KEYWAY ALIGNMENT AND AN ALIGNMENT METHOD

(75) Inventors: Anthony D. Kurtz, Saddle River, NJ (US); Richard J. Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 12/291,451

(22) Filed: Nov. 10, 2008

(65) Prior Publication Data

US 2009/0116537 A1    May 7, 2009

Related U.S. Application Data

(63) Continuation of application No. 11/510,153, filed on Aug. 25, 2006, now Pat. No. 7,464,600.

(51) Int. Cl.
*G01L 7/00* (2006.01)
(52) U.S. Cl. ....................................... 73/714
(58) Field of Classification Search .................. 73/714, 73/716, 736, 756
See application file for complete search history.

(56) References Cited

U.S. PATENT DOCUMENTS 7,464,600 B2    12/2008    Kurtz et al.

*Primary Examiner*—Andre J Allen
(74) *Attorney, Agent, or Firm*—Troutman Sanders LLP; James E. Schutz; Filip A. Kowalewski

(57) ABSTRACT

A transducer sensor is positioned within a hollow of the body of a housing. The housing has an extending alignment pin, which pin coacts with a corresponding slot or aperture in the wall of a vessel whose pressure or temperature is to be monitored. The transducer body is associated with a connector where the alignment pin is placed and extends from the housing in a fixed relation to the connector. A suitable aperture or slot in the wall of the vessel to be monitored accommodates the extending pin whereby when the transducer is placed in the vessel aperture the connector associated with the transducer is always located in proper position. Positioned on the housing is a sliding nut which can move in a direction parallel to the central axis of the housing and either to the right or left. This sliding nut is rotatably positioned in the housing and coacts with threads formed in the aperture in the wall of the vessel to enable tightening of the transducer housing when placed in the wall and when the alignment pin is positioned within the corresponding slot or aperture. This assures a proper alignment so that an external connector which is not moveable or rotatable can be immediately connected to the transducer connector without further experimentation or adjustment.

20 Claims, 4 Drawing Sheets

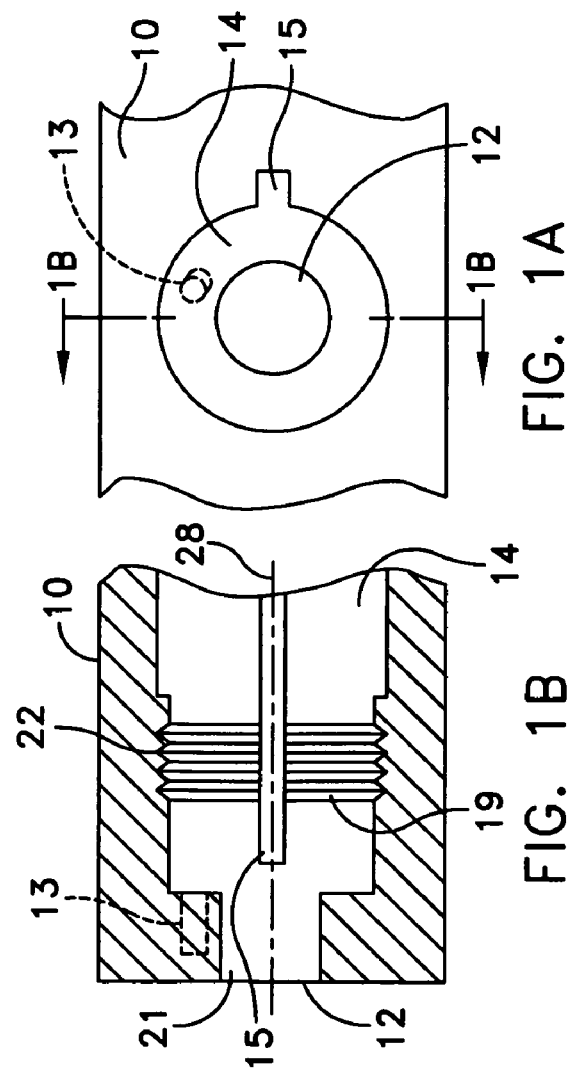
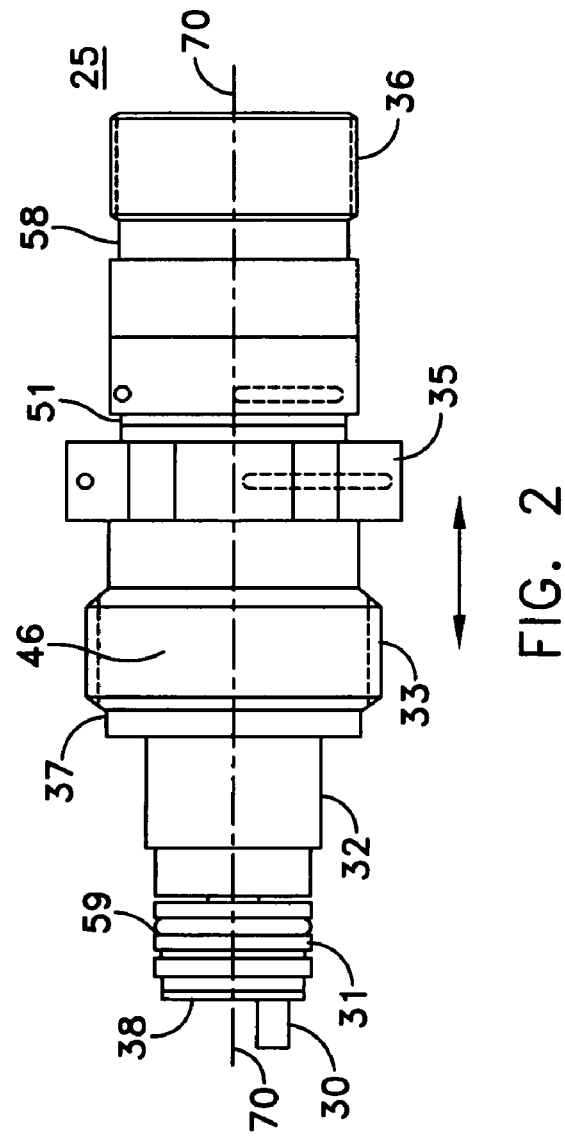

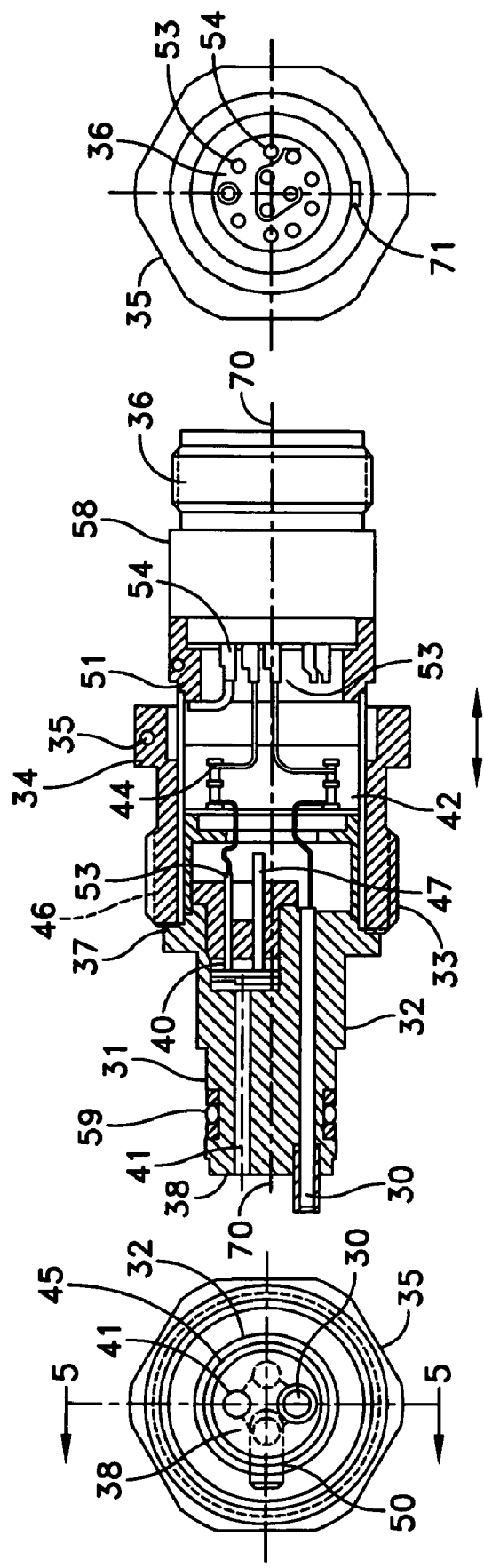

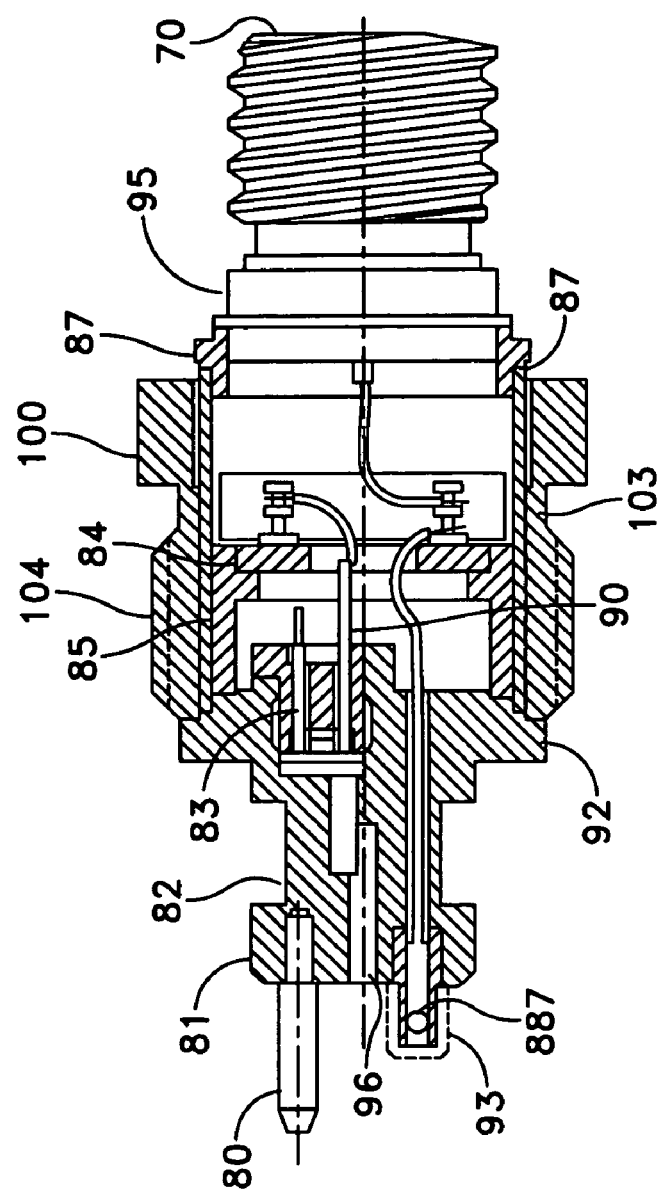
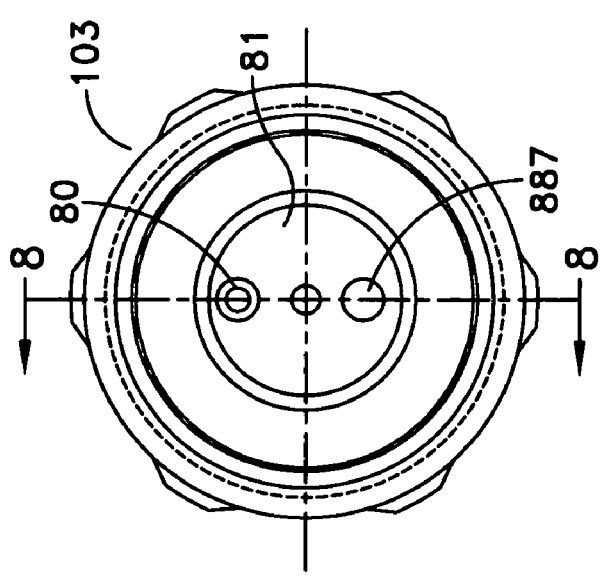
FIG. 8
FIG. 7

COMBINED TEMPERATURE AND PRESSURE TRANSDUCER INCORPORATING CONNECTOR KEYWAY ALIGNMENT AND AN ALIGNMENT METHOD

FIELD OF THE INVENTION

This invention relates to a combined pressure and temperature transducer and more particularly to a combined transducer incorporating connector keyway alignment means.

BACKGROUND OF THE INVENTION

Pressure and temperature transducers are utilized in a wide variety of applications. Such a transducer, for example, may be utilized to monitor the pressure and temperature in an engine. As one can ascertain, engine temperatures are extremely high and a pressure transducer, for example, can be utilized to measure oil pressure as well as the oil temperature in the manifold of a combustion engine or other type of engine. In regard to such operation, the transducer is placed in an aperture, which interfaces with the manifold and which aperture will enable the transducer to interface with the oil or other medium to monitor the temperature and pressure. Associated with such a transducer is a connector, which connector contains a series of leads or terminals which must be accessed by an external system connector. These external connectors utilized in such environments are heavy duty connectors and have, for example, a connector shell which is welded to a connector carrying body which interfaces with a system cable whereby terminal pins of the connector are inserted into the pressure and temperature transducer. In regard to such connectors, strict alignment of the pins is necessary. In any event, when placing such a transducer in an aperture in the manifold based on various prior art techniques, one cannot assure that the system connector terminals will align with the connector associated with the transducer. In this manner extensive labor and time is required to enable the proper insertion of the system connector into the connector associated with the temperature and pressure transducer. Such insertion requires trial and error because there is no particular way of rotating the system connector with respect to the engine transducer once it's placed in the manifold. Such pressure transducers or temperature transducers are placed in the manifold by means of threaded screw arrangements. Therefore, rotation of the transducer can occur and a transducer can be positioned at any particular orientation within a 360° orientation. This, of course, consumes an excessive amount of time in making connection to the pressure and temperature transducer once placed in the aperture associated with the manifold. While it is understood that such prior art techniques are applicable to engines, such a problem in aligning connectors with respect to pressure transducers is a general problem. Therefore, in order to circumvent such problems, there is described a combined temperature and pressure transducer incorporating a connector keyway alignment. This enables the system connector associated with monitoring of the pressure and temperature to be inserted into the pressure and temperature transducer connector in a simple and convenient manner, thus assuring that the connector is always aligned with respect to the connector on the pressure and temperature transducer.

SUMMARY OF THE INVENTION

A transducer assembly for monitoring a condition in the hollow of a vessel, the hollow containing a medium whose condition is to be monitored, the vessel having surrounding walls defining the hollow, comprising: a first vessel wall having an aperture for accommodating a transducer housing, the aperture communicating with the hollow, the aperture having a threaded portion and a keyway alignment portion for accommodating a projecting pin on a transducer housing, a transducer having a housing the housing having an internal hollow, the housing disposed about a central axis, with a front portion of the housing adapted for insertion into the vessel aperture to position the front surface of the first portion in the hollow, the front housing portion extending into a second larger housing portion, the second housing portion having a connector coupled thereto, the connector having a plurality of terminals, a sensor located within the hollow of the housing and having terminals connected to the connector terminals, a sliding nut positioned about the second housing portion, the nut having a threaded section for coacting with the threaded portion of the vessel aperture, the nut capable of sliding on the front portion within a predetermined distance, an alignment pin extending from the housing and positioned in a predetermined orientation with respect to the housing connector, the pin adapted to coact with the key alignment portion of the vessel aperture whereby when the transducer housing is inserted into the vessel aperture with the alignment pin being accommodated within the keyway alignment portion the transducer housing connector is always in a preferred orientation with respect to the alignment pin with the preferred orientation selected to accommodate an external connector to assure that the external connector will always coact with the transducer housing connector, the sliding nut operative to firmly position the transducer housing in the vessel aperture by coacting with the threaded portion of the aperture.

BRIEF DESCRIPTION OF THE FIGURES

FIG. 1A shows a front view of an aperture in a wall of a manifold containing an alignment slot. The aperture accommodates a pressure and temperature transducer according to an embodiment of the invention.

FIG. 1B shows a cross-sectional view of the manifold and the aperture taken through line BB of FIG. 1A.

FIG. 2 shows a side view of a pressure transducer according to an embodiment of the invention.

FIG. 3 shows an isometric view of the system connector.

FIG. 4 shows a top plan view of the pressure transducer of FIG. 2.

FIG. 5 shows a cross-sectional view taken through line 5-5 of FIG. 4 depicting the pressure and temperature transducer according to an embodiment of the invention.

FIG. 6 shows a rear view of the pressure and temperature transducer according to an embodiment of the invention.

FIG. 7 shows a top plan view of an alternate embodiment of a pressure and temperature transducer according to this invention.

FIG. 8 shows a cross-sectional view of the pressure and temperature transducer of FIG. 7 taken through line 88.

DETAILED DESCRIPTION OF THE INVENTION

Figure 9:
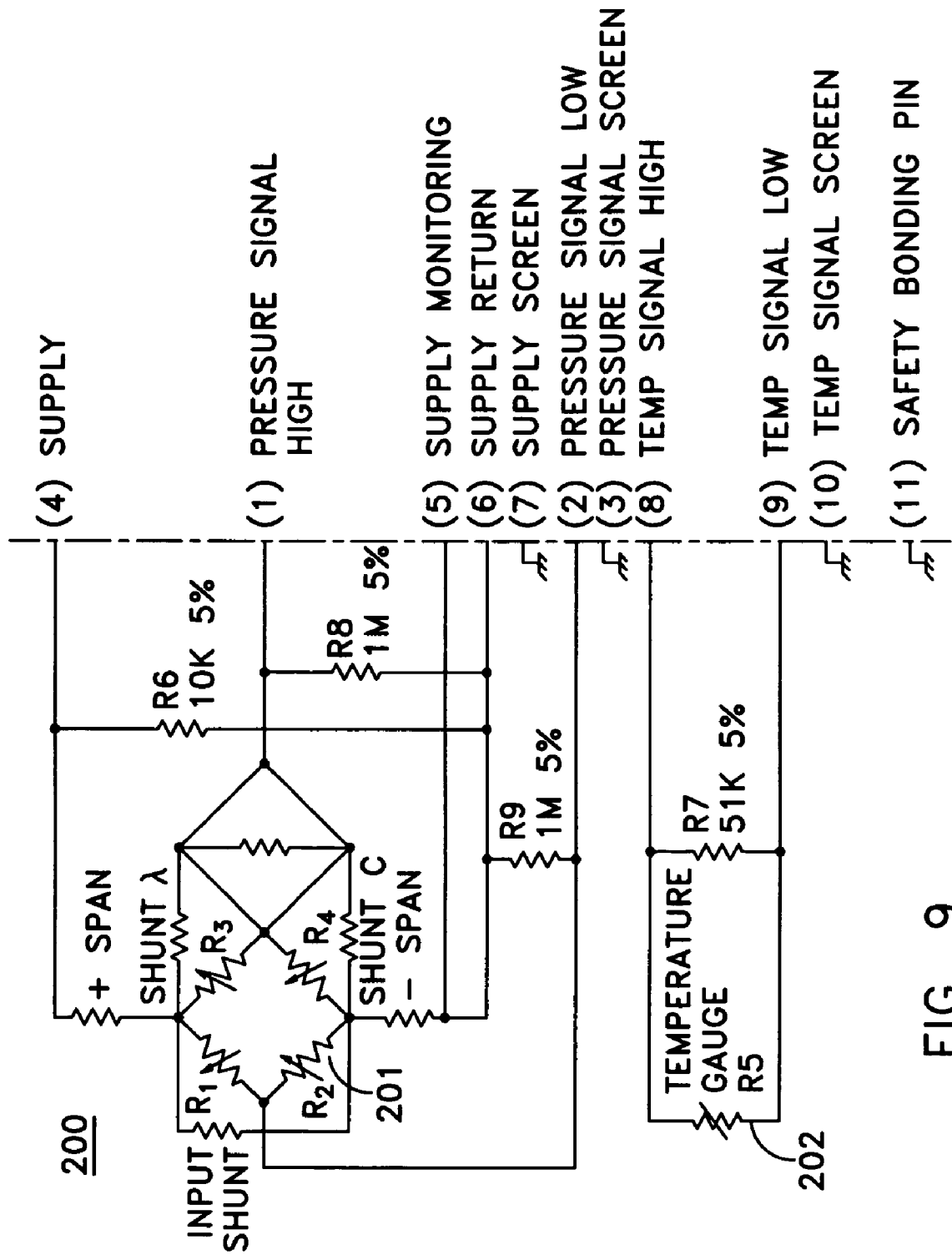
FIG. 9 depicts a circuit diagram of a typical Wheatstone bridge array employed in a pressure transducer according to an embodiment of the invention.

Referring to FIG. 1 and particularly to FIG. 1A, there is shown a front view of a portion of a manifold wall 10. The manifold wall 10 has a pressure transducer accommodating aperture which consists of a first through aperture 12 of a diameter smaller than that of a concentric aperture 14. The aperture has a slot 15 which provides alignment for the pressure and temperature transducer which is inserted into the slot. As indicated, the aperture 12 communicates directly with the hollow of the manifold, and oil or other material flows past the aperture 12. There is also shown in dashed line a key alignment aperture 13 in the wall of the manifold which accommodates a transducer assembly according to an embodiment of the invention as shown in FIG. 8. Also depicted in FIG. 3, is a system connector 16. The connector has a connector body and includes a plurality of terminal pins 18. The connector also has a master keyway or an alignment mechanism 20. The connector has the terminal pins such as 18 directed to a cable 17 which is directed to a system monitoring device. The connector 16 is fixed in orientation. In the illustrated embodiment, cable 17 is quite large and has a substantial insulation. As seen the connector 16 has a plurality of pins as 18, all of which have to be aligned when the connector is placed in the connector associated with a temperature and pressure transducer. The system connector 16 is welded to the body and cannot be rotated or adjusted as it is fixed in position. Thus, one problem is that the connector 16 together with its terminal pins 18 and its alignment keyway 20 is oriented in one position for insertion into the connector associated with the pressure transducer unit. As indicated, the prior art had a great deal of difficulty in securing the pressure transducer connector within the aperture in the manifold of the engine and therefore many attempts had to be made before the connector would be properly aligned with the pressure and temperature transducer.

Referring to FIG. 1B there is shown a cross-sectional view of the aperture in the manifold 10 depicting the nature of the same. As seen in FIG. 1B, the through aperture 12 extends into the manifold based on a front opening 21. Positioned on the side of the aperture is a key alignment slot 15. The slot 15 is parallel to the central axis 28 of the aperture. The key alignment slot 15 accommodates an extending pin associated with the pressure and temperature transducer. This pin rides in the slot 15 and enables the pressure and temperature transducer to be inserted in an exact position so that one is assured that the connector 16 will interface directly with the connector associated with the pressure and temperature transducer. While the present invention relates to a pressure and temperature transducer utilized in a manifold, it is of course understood that the mechanism or alignment mechanism as described herein, can be employed with any transducer, as an aspect of the invention includes a transducer accurately aligned so that it can accurately be connected to a fixed connector. The fixed connector 16 cannot be rotated, twisted or otherwise moved and therefore must coact exactly with the transducer. Thus, as seen in FIG. 1B the aperture 12 coacts with the fluid existing in a manifold which may be oil or some other fluid and the aperture 12 is coaxial with the larger aperture 14 and disposed about the central axis 28. The aperture in the manifold also contains a threaded portion 22 which as will be explained coacts with a threaded portion on a free sliding nut positioned on the pressure transducer. This enables the entire transducer to be tightened and firmly secured in the aperture 12 of the manifold when a pin associated with the connector is placed within the slot 15 to assure perfect alignment of the pressure or temperature transducer. While FIG. 1 portrays a manifold, it is understood that any vessel which contains a fluid or where temperature and pressure or some other property is to be measured, is applicable. In regard to a manifold, it is understood that the manifold contains oil which flows throughout the engine for lubrication and other purposes, as is well known in the art. The pressure and temperature of the oil is to be measured and the pressure and temperature transducer according to the invention can be utilized and inserted into the aperture in the manifold and aligned so that a system connector 16 can be properly and quickly inserted in perfect alignment. According to an aspect of the invention, when the transducer is placed in the wall of a vessel, a connector which is attached to a cable as connector 16 and cable 17, will be perfectly oriented and therefore will be able to coact with the connector associated with the pressure or temperature transducer. While the above-noted discussion depicts a combination pressure or temperature transducer, it is immediately understood that the invention herein can be employed with only a pressure transducer, or only a temperature transducer or any transducer whereby alignment is absolutely necessary when the transducer is placed in location where a system connector associated with external circuitry cannot be adjusted so as to assure a proper alignment of the transducer connector when placed in a wall or other location.

Referring to FIG. 2, there is shown a side view of a combined temperature and pressure transducer located in a housing 25. As one can see, the housing 25 essentially consists of a series of cylindrical portions which are symmetrically disposed about central axis 70. There is shown a front surface 38 which has an aperture which coacts with a channel to access to the medium to engage a deflectable diaphragm associated with a pressure sensor. Also seen, emanating from the front surface is the tip 30 of a temperature sensor. The housing 25 includes a front portion 30 or section 31 of a given diameter which has an indentation portion containing a series of O-rings 59. The O-rings may be three or more in number and essentially are pressure fit into aperture 12 to create a firm seal, thereby preventing any fluid contained in the manifold or the vessel to leak through aperture 12. Secured to the front portion 31 is a larger cylindrical portion or section 32 which has a front peripheral or circular flange 37 located adjacent to the front portion 31. Located on the body of the section 32 is a sliding nut 33 which is rotatably mounted on section 32. The nut 33 has a threaded portion 46 which coacts with the thread 22 located in the aperture 14 in the manifold as seen in FIG. 1B. The threaded portion 33 coacts and terminates in a hex flange 35. The hex flange 35 coacts with the nut and one can tighten the sliding nut via threads 46 when it is inserted into the aperture in the manifold. As seen there is a back flange 51 associated with a back section 58 of the assembly. The back flange 51 together with the flange 37 determines the amount of lateral movement or the amount of sliding of the sliding nut 33 on the transducer housing body 25. Thus, the nut 33 can slide on the housing within the limits determined by flanges 37 and 51. Section 58 terminates into a connector portion 36.

Referring to FIGS. 4 and 5, there are shown a front view and a cross-sectional view taken through line 5-5 of the transducer 25. A temperature sensor 30 also depicted in FIGS. 2 and 5, protrudes from the front surface 38. The cylindrical front section 31 contains an aperture which accommodates a pin 50. The pin 50 protrudes from the housing section 31 and basically is located for insertion into the slot 15 of the manifold aperture. While the pin 50 is shown located on the front section 31, it can be located on any section of the transducer housing. The slot 15 is shown by way of example, extending from the wall of aperture 14 to the wall of aperture 12. When the pin is inserted into the slot 15 the entire transducer assembly is totally aligned with respect to the connector 16 as for example, depicted in FIG. 1. Again, as indicated, the front aperture communicates with a bore 41 which directs pressure to a semiconductor sensor structure 40 shown in FIG. 5. Semiconductor sensor structure 40 is located in a cavity in the housing section 32. The housing section 32 together with the peripheral flange 37 is associated with a shell portion on which the sliding nut 33 rides. The nut 33 as indicated has a threaded portion 46 and is rotatably mounted on section 32. The end of the nut is a hexagonal flange 35 which has a larger diameter 34 than the threaded portion of the nut 33. The nut 33 can move to the left or right as indicated by the arrow beside it, and is limited in lateral motion by means of flange 37 and flange 51. The transducer assembly 40, which is typically a piezoresistive sensor assembly contains a semiconductor wafer upon which is deposited piezoresistors. The piezoresistors are located on an active area of the semiconductor wafer. When a pressure is applied via the channel 41, the active area or diaphragm area of the sensor 40 deflects. The sensor 40 typically contains a bridge array such as a Wheatstone bridge array whereby the piezoresistors in the Wheatstone bridge array vary their resistance according to the magnitude of an applied pressure, and therefore the sensor produces an output voltage proportional to pressure. The sensor has suitable leads as 53 and 47 which are directed to a terminal board 42. Terminal board 42 has pins as 44 which again are directed to suitable terminal pins as 54 of a connector assembly 58. The connector assembly typically has an end which contains a number of apertures or pins. It is understood that connector 36 can be a male or female connector depending upon connector 16 of FIG. 3, which also can be a male or female connector.

As seen in FIG. 6, the connector associated with the assembly has a plurality of terminals 50 and 54 which accommodate the terminals of the pressure sensor as well as the temperature sensor 30. In a Wheatstone bridge configuration, the sensor would have four or more active terminals which enable one to bias the Wheatstone bridge as well as to receive an output from the Wheatstone bridge. It is understood that there can be more than four terminals. In a similar manner, the temperature sensor 30 would have at least two terminals which are all directed to the connector portion 36. The connector portion 36 has a master keyway 71. This keyway 71 determines the position of terminals 53 and 54 and therefore when pin 50 is placed in the slot 15, the keyway 71 is positioned in an exact location as determined by the extending pin 50 once captured in the slot 15 of the housing. The temperature sensor depicted in FIG. 2 is also referenced in FIG. 5 by reference numeral 30 as in section 31 with the corresponding O-rings 59 and so on.

Referring to FIGS. 4, 5 and 6 in conjunction with FIGS. 1A and 1B, one can ascertain the following. The pressure transducer as indicated has an extending pin 50 which pin 50 will coact and be placed within slot 15 (FIG. 1) associated with the manifold aperture. In use, one inserts the pressure temperature housing 25 into the apertures as 12 and 14 associated with the manifold. The front section of the housing 31 as inserted protrudes from aperture 12 and extends into the vessel or manifold hollow. The O-rings create a seal and allow the temperature sensor 30 to protrude into the manifold. The channel 41 having an aperture located on the front surface 38 of the pressure transducer, also allows the pressure sensor 40 to receive a pressure. Once placed in the aperture, the threaded portion 46 of the sliding nut 33 engages the threads 20. The hex flange 35 is then accessed and the nut is rotated to tighten and position the transducer assembly. It is immediately seen that because the nut 33 is a sliding and rotatable nut it can be locked in position without affecting the orientation of the pressure sensor housing 25. In this manner, the connector of the pressure temperature transducer 36 and the associated pins 53 and 54 are always properly aligned together with the master keyway 71. Thus, as one can see, the insertion of the transducer 50 into the manifold aperture is rapid and all one has to do is to assure that the extending pin 50 rides and coacts with the slot 15. Once this is accomplished, the threads of the sliding nut then enable one to tighten the entire apparatus in place whereby the orientation of the connector portion 36 in regard to the associated terminals 53 and 54 is in proper position to accommodate the system connector 16 for monitoring both pressure and temperature operation.

Referring to FIGS. 7 and 8 there is shown an alternate embodiment of a pressure temperature transducer assembly which can be employed together with this invention. Basically FIG. 8 shows an extending pin 80 which extends from the front surface of the housing. The housing contains the pressure sensor 83 and the temperature sensor 87. The pin 80 enables one to insert the entire structure into the manifold where the pin 80 will coact with aperture 13 in the wall of the manifold shown dashed in FIG. 1A. When the pin 80 is inserted into aperture 13 the connector portion of the transducer assembly as 95 again will be properly oriented with respect to the cable 16. The front surface of the housing does not protrude into the manifold but is in direct communication with the fluid as the front surface is aligned with the front wall surface of the manifold. As seen in FIG. 8 the pressure sensor has a front housing section 81 which has an indentation 82 to accommodate the O-rings, not shown. The internal cavity contains the pressure sensor 83 which again is a semiconductor sensor with the leads of the sensor directed to terminal board 84 via terminal pins such as 90. Sliding nut 103 has a threaded portion 104, and a back hex flange 100 to enable tightening of the same and the nut slides on the body 85 which is a shell attached to the housing section 92. The nut shown in FIG. 8 slides in the same manner as that shown in FIG. 5 and is limited in motion due to flanges 92 and 87. Thus the assembly depicted in FIG. 8 operates essentially in the same manner as that depicted in FIG. 5 with the exception that the pin 80 extends from the front surface instead of extending transverse to the transducer body as shown in FIG. 4. Essentially, the pin 80 is now parallel to the central axis 70 while in FIG. 4, the pin 50 is transverse to the central axis 70. Other reference numerals depicted in FIG. 8 include terminal pins as 90 associated with the transducer assembly. There is also shown a dashed line or a shroud 93 which covers the front of the temperature sensor, which is optional. Basically, as seen, the housing shown in FIG. 8 constitutes similar parts as that depicted in FIG. 5 with the exception that the pin 80 is parallel to the central axis 70 while the pin 50 of FIG. 4 is transverse. Both configurations enable a proper alignment of the connector associated with the pressure temperature transducer and therefore enables an external connector as 16 to be immediately inserted in proper orientation without further experimentations or adjustment. This eliminates a tremendous amount of time in installing such sensors in very tight situations such as exist in the manifold of an engine or in other places where easy access is limited and where one does not have the opportunity to constantly adjust or rotate the sensor so that it coacts with the connector. The above-noted invention enables one to immediately assure that the transducer with its associated connector will immediately interface with an external connector once the transducer is inserted in position and the sliding nut associated with the transducer coacts the threads in the aperture in the vessel to be monitored and therefore locks the transducer in proper position.

It is understood that the pressure transducer housing, when placed within the aperture in a wall of the manifold, is properly oriented based on either the position of pin 50 or pin 80. Both pins are accurately positioned with respect to the master keyway 71 associated with the pressure transducer housing connector 36 as shown in FIG. 6. The connector 16 associated with the system in an automobile or aircraft., for example, is immediately and properly inserted into the transducer connector. The sliding nut enables one to firmly secure die transducer housing within the aperture by means of the threads 20 formed within the aperture. It is thus seen that there is provided a simple and efficient way of assuring connector keyway alignment in a transducer.

While a combined pressure and temperature transducer was discussed, the present invention relates to any transducer assembly whereby the transducer connector has to be properly oriented with respect to an external connector for immediate and rapid connections. This invention, as indicated eliminates trial and error positioning which exists and is prevalent in the prior art.

All such modifications and alterations are deemed to be encompassed within the spirit and scope of the claims appended hereto. While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A transducer assembly for monitoring a condition in the hollow of a vessel, said hollow containing a medium whose condition is to be monitored, said vessel having surrounding walls defining said hollow, comprising:
    a first vessel wall having an aperture for accommodating a transducer housing, said aperture communicating with said hollow, said aperture having a threaded portion and a keyway alignment portion for accommodating a projecting pin on a transducer housing,
    a transducer having a housing, said housing having an internal hollow, said housing disposed about a central axis, with a front portion of said housing adapted for insertion into said vessel aperture to position said front surface of said first portion in said hollow, said front housing portion extending into a second larger housing portion, said second housing portion having a connector coupled thereto, said connector having a plurality of terminals,
    a sensor located within said hollow of said housing and having terminals connected to said connector terminals, and
    an alignment pin extending from said housing and positioned in a predetermined orientation with respect to said housing connector, said pin adapted to coact with said key alignment portion of said vessel aperture whereby when said transducer housing is inserted into said vessel aperture with said alignment pin being accommodated within said keyway alignment portion, said transducer housing connector is always in a preferred orientation with respect to said alignment pin, with said preferred orientation selected to accommodate an external connector to assure that said external connector will always coact with said transducer housing connector.

2. The transducer assembly according to claim 1, wherein said sensor is a pressure sensor.

3. The transducer assembly according to claim 2, further including a temperature sensor located in said hollow of said housing and having a front portion located about said front surface of said front housing portion and having terminal leads connected to associated terminals of said housing connector.

4. The transducer assembly according to claim 1, wherein said vessel is an engine manifold, where said medium to be monitored is engine oil contained in said manifold hollow.

5. The transducer assembly according to claim 1, wherein said second housing portion has a first peripheral flange located about the front end of said second housing portion closest to said first portion and a second peripheral flange located about the rear end of said second housing portion nearest said connector, and a sliding nut rotatably positioned about said second portion and constrained to limited movement of said predetermined distance as determined by said first and second flanges.

6. The transducer assembly according to claim 1, wherein said projecting alignment pin extends from said transducer housing transverse to said central axis of said housing.

7. The transducer assembly according to claim 1, wherein said projecting alignment pin is parallel to said central axis and extends from said front surface of said transducer housing.

8. The transducer assembly according to claim 6, wherein said keyway alignment portion is a slot formed in a wall of said vessel aperture and parallel to the central axis of said aperture for accommodating said transverse extending pin when said transducer housing is inserted into said aperture.

9. The transducer assembly according to claim 7, wherein said key alignment portion comprises an aperture formed in said vessel wall for accommodating said parallel pin when said transducer housing is inserted in said aperture.

10. A method of mounting a transducer in a wall of a medium accommodating vessel having a medium accommodating hollow, wherein a condition of said medium is to be monitored for proper system operation, said system having a system connector connected to a cable, said system connector oriented in a fixed position and employed for insertion into a transducer connector to enable said system to monitor said medium, comprising the steps of:
    forming an aperture in said vessel wall with one end of said aperture communicating with said vessel hollow, forming a keyway in said aperture wall for accommodating an alignment transducer pin,
    providing a transducer housing having a front portion contiguous with a rear portion, said housing having an internal hollow with said housing disposed about a central axis,
    placing a housing connector on said rear portion of said housing and oriented in a predetermined relation with respect to said housing, said housing connector having terminals,
    placing a sensor having terminals within the said hollow of said housing with said terminals of said sensor connected to terminals of said housing connector, and
    placing an alignment pin on said transducer housing to cause said pin to extend from said housing and locating said pin on said housing so that said connector is always in a predetermined position with respect to said pin, said pin operative to coact with said keyway to align said transducer connector always in a predetermined orientation, such that said connector always properly coacts with said system connector.

11. The method according to claim 10, further including the steps of securing said housing within said aperture by providing a sliding nut surrounding a portion of said housing and having a threaded portion, with said vessel aperture housing having a corresponding threaded portion, and engaging said sliding nut with said corresponding threaded portion of said vessel aperture to firmly secure said transducer housing in said vessel aperture.

12. The method according to claim 10, further including the step of forming a slotted keyway in the wall of said aperture parallel to said central axis of said aperture, and placing said alignment pin transverse to said central axis of said transducer housing for co-acting with said slot when said housing is positioned in said vessel aperture.

13. The method according to claim 10, further including the step of forming an aperture keyway on the wall of said housing near said front surface and placing said alignment pin parallel to said central axis of said transducer housing for coacting with said aperture keyway when said housing is positioned in said vessel aperture.

14. The method according to claim 10, wherein said vessel is an engine manifold containing engine oil within said hollow.

15. The method according to claim 10, wherein said sensor monitors the pressure of said oil.

16. The method according to claim 10, wherein said sensor monitors the temperature of said oil.

17. The method according to claim 10, wherein said sensor monitors both the pressure and temperature of said oil.

18. The method according to claim 10, further including, in the step of placing said alignment pin on said housing, the step of placing an alignment marker on said housing connector and positioning said pin on said housing with respect to said marker.

19. The method according to claim 10, wherein said sensor is a piezoresistive semiconductor pressure sensor having four piezoresistors arranged in a Wheatstone bridge array, with said terminals of said array connected to associated terminals of said housing connector.

20. The method according to claim 10, wherein said transducer housing is symmetrically disposed about said central axis.

* * * * *